Figure 1:
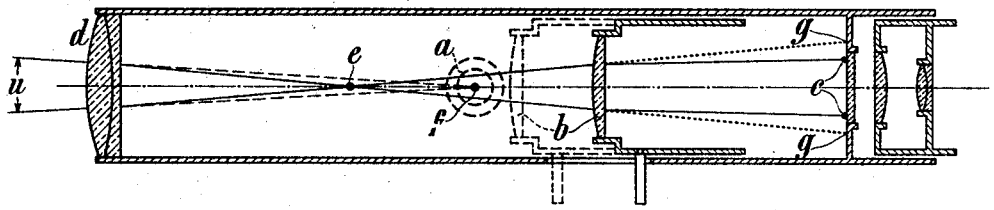

H. WILD.
TACHOMETRIC TELESCOPE.
APPLICATION FILED OCT. 27, 1910.

1,016,311.

Patented Feb. 6, 1912.

Witnesses:

Inventor:

UNITED STATES PATENT OFFICE.

HEINRICH WILD, OF JENA, GERMANY, ASSIGNOR TO THE FIRM OF CARL ZEISS, OF JENA, GERMANY.

TACHOMETRIC TELESCOPE.

1,016,311.   Specification of Letters Patent.   Patented Feb. 6, 1912.

Application filed October 27, 1910. Serial No. 589,384.

*To all whom it may concern:*

Be it known that I, HEINRICH WILD, a citizen of the German Empire, residing at Carl-Ziess strasse, Jena, in the Grand Duchy of Saxe-Weimar, Germany, have invented a new and useful Tachometric Telescope, of which the following is a specification.

The invention relates to tachometric telescopes (*i. e.* stadia telescopes used for rapid surveying.) Its object is to construct such a telescope according to the advantageous arrangement, well-known for other telescopes: that neither the objective nor the system of marks arranged in the focal plane of the objective is shiftable in the direction of the telescope, but that the adaptation to objects at different distances is carried out by shifting a collective or dispersive lens disposed between the objective and the system of marks—and in such a manner, that the advantage given by Porro to the tachometric telescope after Reichenbach, viz. that by the said adaptation the tachometric (parallactic) angle changes neither its magnitude nor its position, is also attained. In order to approximate to such an unchangeableness of the tachometric angle sufficiently closely, the dimensions of and fixed distances between the objective, the tachometric (parallactic) pair of marks and the lens are chosen in such a manner, that the distance from the lens to the pair of marks and that from the lens to the image, which is projected by the objective, of that point, in which—strictly speaking only in consequence of this setting—the apex of the tachometric angle lies, is about the same, when the lens is set for very distant objects, and that the greater of these two distances (from the lens to the pair of marks, when the lens is collective, or from the lens to the image of the apex, when the lens is dispersive) is not more than three times the smaller one, when the lens is set for the nearest objects to be measured (say about 5 m. from the telescope). The said dimensions and fixed distances may further be chosen in such a way, that, according to the precedent of Porro, the apex of the tachometric angle is located in the tilting axis and so, at the same time, in the vertical axis of rotation of the tachometer. If the advantage due to this arrangement is waived, another one may be adopted for it. If to the conditions for the choice of the dimensions and fixed distances is added this one, that the apex of the tachometric angle shall lie in the objective, then the tachometric angle is, as regards position and magnitude, also independent of the small alterations in the focal length, to which the objective is subject. The distance from the lens to the pair of marks and that from the lens to the objective is in this case about the same, when the lens is set for very distant objects, as the image of the apex of the angle, projected by the objective, as well as the apex itself, lies in the objective.

Figure 2:
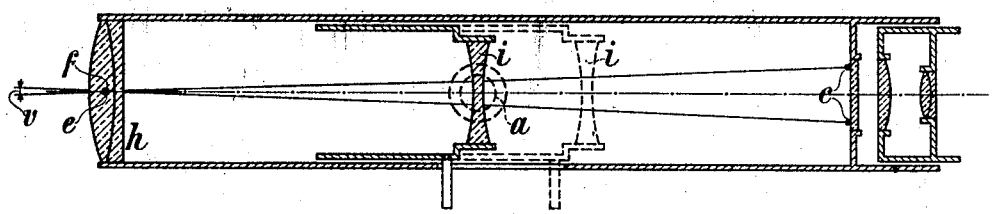

In the annexed drawing: Figure 1 is a diagrammatic view of a section along the optical axis of a tachometric telescope constructed according to the invention. Fig. 2 is a diagrammatic view of a section along the optical axis of a second form of such a telescope.

In Fig. 1 the apex of the tachometric angle $u$ lies in the tilting axis indicated by the journal $a$. The shiftable lens is a collective lens $b$. Its position, in which its distance from the tachometric pair of marks $c\ c$ is about the same as its distance from the image of the apex $f$ of the angle $u$, projected by the objective $d$, corresponds to the setting for very distant objects, its position indicated by dotted lines to the setting for the nearest objects. The principal rays passing through $e$ of the pencils producing the image points in $c\ c$ would, as the dotted lines indicate, pierce the plane of the marks $c\ c$ in $g\ g$, if the lens $b$ were shifted as far as $e$. To maintain during such shifting the tachometric angle $u$ as regards position and magnitude would require a gradual increase in the distance apart of the marks from the dimension $c$—$c$ to the dimension $g$—$g$. But this increase is, as long as the lens $b$ be not shifted beyond the position shown in dotted lines, very small, so that the minimum distance $c$—$c$ between the marks need not be increased at all when adapting the telescope to the nearest objects, provided that the focal length of the lens is so small, that, when for this adaptation the lens has been shifted into the position shown in dotted lines, the distance from the lens to the plane of the marks $c\ c$ is not more than three times the distance from the lens to $e$. Then to the fixed distance $c$—$c$ between the marks there corresponds a tachometric angle $u$ of almost unchangeable magnitude and position.

In the tachometric telescope according to Fig. 2 the points $e$ and $f$ both lie in the optical center of the objective $h$. The shiftable lens is a dispersive lens $i$. After the lens has been set for very distant objects, the distance from the lens to the objective is about the same as that from the lens to the plane of the marks $c\ c$. As the principal rays of the pencils producing image points in $c\ c$ pass through the optical center of the objective, the direction of the said principal rays does not change for a small variation of the focal length of this objective. It will be understood, that the small shifting of the lens $i$, which is requisite for compensating the alteration in the focal length of the objective, does not for itself alone cause a noticeable alteration in the distance apart of the two image points. For the position of the tachometric angle $v$, here chosen, this position and the magnitude of $v$ are therefore also independent of an accidental alteration in the focal length of the objective $h$.

I claim:

1. In a tachometric telescope, an objective, a tachometric pair of marks and a lens shiftably fitted between the objective and the said pair of marks, the distance from the lens to the pair of marks and that from the lens to the image, which is projected by the objective, of that point in which the apex of the tachometric angle lies, being about the same, when the lens is set for very distant objects, and the greater of these two distances being not more than three times the smaller one, when the lens is set for the nearest objects.

2. In a tachometric telescope, an objective, a tachometric pair of marks and a lens shiftably fitted between the objective and the said pair of marks, the apex of the tachometric angle lying in the objective, the distance from the lens to the pair of marks and that from the lens to the objective being about the same, when the lens is set for very distant objects, and the greater of these two distances being not more than three times the smaller one, when the lens is set for the nearest objects.

HEINRICH WILD.

Witnesses:
 PAUL KRUGER,
 ALFRED MACKEDANZ.